United States Patent
Dagher et al.

(10) Patent No.: US 6,281,148 B1
(45) Date of Patent: Aug. 28, 2001

(54) RESIN STARVED IMPREGNATED PANELS, WOOD COMPOSITES UTILIZING SAID PANELS AND METHODS OF MAKING THE SAME

(75) Inventors: Habib Dagher, Veazie; Beckry Abdel-Magid, Orono; Stephen M. Shaler, Veazie, all of ME (US)

(73) Assignee: University of Maine, Orono, ME (US)

( * ) Notice: Subject to any disclaimer, the term of this patent is extended or adjusted under 35 U.S.C. 154(b) by 0 days.

(21) Appl. No.: 09/014,360

(22) Filed: Jan. 27, 1998

(51) Int. Cl.[7] ............................ B32B 27/04; B32B 27/14; B32B 5/02
(52) U.S. Cl. ............................................ 442/71; 428/537.1
(58) Field of Search ............................. 428/537.1; 442/71

(56) References Cited

U.S. PATENT DOCUMENTS

| | | |
|---|---|---|
| 5,362,545 | 11/1994 | Tingley . |
| 5,498,460 | 3/1996 | Tingley . |

*Primary Examiner*—Terrel Morris
*Assistant Examiner*—Norca L. Torres
(74) *Attorney, Agent, or Firm*—Michael J. Persson; Lawson, Philpot & Persson, P.C.

(57) ABSTRACT

The present invention is a resin-starved pultruded-impregnated panel, wood composites utilizing said panel, and a method of making the same. The panel of the present invention comprises a pultruded center portion made from a plurality of fibers bound together by a resin such that the surfaces of the center portion contain significantly less resin than the core, and a layer of an impregnating adhesive, having similar chemical properties to chemical properties of a bonding adhesive used to laminate layers of the wood composite, bonded to each surface to form the surfaces of the panel. The wood composite of the present invention comprises a plurality of wooden members disposed in substantially parallel relation to one another, at least one resin starved pultruded panel disposed at a predetermined location between two of the members; and a bonding adhesive disposed between the surfaces of the members the panel to bond them together. The method of the present invention comprises the steps of forming a resin starved pultruded impregnated panel by forming a pultruded center portion having a pair of resin starved surfaces, impregnating the surfaces with an impregnating adhesive, removing a portion of the impregnating adhesive to form a substantially smooth flat surface, and curing the remaining adhesive, disposing the panel between at least two wooden members, and bonding the panel and wooden members together to form a wood composite.

18 Claims, 2 Drawing Sheets

RESIN STARVED IMPREGNATED PANELS, WOOD COMPOSITES UTILIZING SAID PANELS AND METHODS OF MAKING THE SAME

BACKGROUND OF THE INVENTION

1. Field of the Invention

The invention relates to fiber-reinforced plastic panels, wood composites and to methods of manufacturing such panels, and in particular to fiber-reinforced plastic panels that are bonded using industry recognized wood adhesives.

2. Description of the Related Art

FRP-wood hybrids offer considerable potential for widespread use in construction and infrastructure applications. In addition to increasing the strength, stiffness and ductility of engineered wood composites, the hybrids allow for the utilization of low-grade lumber in construction. The hybrids also offer flexibility in design allowing for longer spans, lower depths, and lighter structures. One important factor in developing this hybrid technology is to provide adequate bond strength between the FRP reinforcement and the wood.

Pilot studies in the past five years by the inventors and others have shown the significant promise of combining wood and FRP. The inventor's studies have revealed, for example, that FRP reinforcement in the order of 2% can increase the bending strength of wood beams by over 50%.

The idea of reinforcing wood is not new. Many studies on wood reinforcement have been performed in the past 40 years. Often metallic reinforcement was used including steel bars, prestressed stranded cables, and stressed or unstressed bonded steel and aluminum plates. While significant increases in strength and stiffness have been achieved, the problems encountered were generally related to incompatibilities between the wood and the reinforcing material. Wood beams reinforced with bonded aluminum sheets experienced metal-wood bond delamination with changes in moisture content of only a few percent. The differences in hygro-expansion and stiffness between the wood and reinforcing materials can lead to separation at the glue-line, or tension failure in the wood near the glue-line.

To improve durability, fiberglass has been used in a number of ways, such as for beam reinforcement, as face material of wood-core sandwich panels, as external reinforcement for plywood, and in the form of prestressed strands. Unlike traditional steel and aluminum reinforcement, FRP reinforcement of wood composites can be successful because the physical/mechanical/chemical properties of the FRP are very versatile. The FRP may be engineered to match and complement the orthotropic properties of wood; consequently, incompatibility problems between the wood and the reinforcing FRP are minimized.

FRP materials (fibers/matrix) can be readily incorporated into many of the manufacturing processes currently used to produce structural wood composites.

In recent years, the bond strength of the FRP-wood interface has been investigated by a number of researchers and some related patents have been issued. U.S. Pat. No. 5,498,460, issued to Tingley, discloses a method of bonding FRP to wood using surface sanding to "hair up" fibers. In U.S. Pat. No. 5,362,545, also issued to Tingley, the inventor discloses a method to produce surface recesses on the FRP to enhance the bond strength.

In Forest Products Journal, Vol. 44, No. (5), pp. 62–66, 1994, Gardner et el. examined several different adhesive systems for use in glue-laminated wood structures. These included resorcinol formaldehyde (RF), an emulsion polymer isocyanate (EPI), and an epoxy resin. For composite joints fabricated from glass-reinforced vinylester or polyester FRPs and yellow poplar, the highest shear strengths were obtained using the RF adhesives, followed by the epoxy and EPI systems. The RF adhesive was also found to produce the greatest percentage of dry test failures within the wood matrix for wood-vinylester FRP matrix systems with values exceeding 90%. However, polyester-wood joints were found to produce almost 100% cohesive failures within the FRP matrix under dry conditions. Wet tests produced only 20 to 40% wood failures for vinylester-wood joints and 80% FRP matrix failures for polyester/wood joints.

Dailey et al. disclose in the Proceedings of Composites Institute's 50th Annual Conference & Expo '95, Composites Institute of the Society of the Plastics Industry, Inc., Cincinnati, Ohio, pp. 1–4, Session 5-C, the bonding of pultruded glass/phenolic composites to Douglas-fir. Both resorcinol formaldehyde (RF) and resorcinol-modified phenolic (PRF) adhesives were studied. Initial shear testing showed the PRF to outperform the RF. The authors varied such parameters as open and closed times, clamping pressure, and cure periods. They concluded that a long curing period increased the bond strength and emphasized the need for additional research to completely quantity the mechanical properties of the FRP-wood hybrids.

There is not found in the prior art a simple, inexpensive, commercially viable method of bonding FRP panels together or to other surfaces, such as wood, that uses common, proven wood adhesives, yet meets or exceeds shear bond strength requirements as specified under ANSI/AITC 190.1 and cyclic-delamination requirements under AITC 200.

SUMMARY OF THE INVENTION

The present invention is a resin-starved pultruded-impregnated panel, wood composites utilizing said panel, and a method of making the same. In its most basic form, the panel of the present invention comprises a pultruded center portion made from a plurality of fibers bound together by a resin such that the surfaces of the center portion contain significantly less resin than the core, and a layer of an impregnating adhesive, having similar chemical a bonding adhesive used to laminate the surfaces of the panel to immediately adjacent layers of wood, applied to each surface to form the surfaces of the panel. In the preferred embodiment of the panel of the present invention, a plurality of sacrificial edges are bonded to at least two of the outside edges, and the center portion comprises a pultruded glass fiber reinforced plastic sheet impregnated with a phenol-resorcinal formaldehyde adhesive.

In its most basic form, the wood composite of the present invention comprises a single wood member and at least one resin starved pultruded panel disposed at a predetermined location against the wood member, and a bonding adhesive disposed between the surfaces of the member and the panel to bond them together. In the preferred embodiment of the invention, a plurality of wooden members are disposed in substantially parallel relation to one another, at least one resin starved pultruded panel is disposed at a predetermined location between two of the members, and the bonding adhesive is disposed between the surfaces of the members and the panel to bond them together. In this preferred embodiment, the resin starved pultruded panel has at least two planable sacrificial edges formed with, or bonded to, edges of the panel, such that the panel may be easily aligned with the members, and the shear strengths of bonds between surfaces of the panel and the wooden members exceed the shear strength of the immediately adjacent wood members. In some embodiments, the wooden members and the panel are bonded together to form glulam beams, LVL beams. PSL beams, LSL beans, I-joists, or flat composite panels such as plywood.

In its most basic form, the method of the present invention comprises the steps of forming a resin starved pultruded impregnated panel by forming a pultruded center portion having a pair of resin starved surfaces, impregnating the surfaces with an impregnating adhesive, removing a portion of the impregnating adhesive to form a substantially smooth flat surface, and partially curing of the remaining adhesive, disposing the panel against a wooden member, and bonding the panel and wooden member together to form a wood composite. In the preferred embodiment of the method, at least a second wooden member is disposed adjacent an opposite surface of the panel and bonded to the panel, a pair of sacrificial edges are bonded to the panel, and the composite structure is planed to size.

Therefore, it is an aspect of the invention to provide a method for reinforcing a wood composite that is suitable for use with glued laminated beams, LVL beams. PSL beams, LSL beans, I-joists, or flat composite panels such as OSB and plywood.

It is another aspect of the invention to provide a method for reinforcing a wood composite that uses common wood adhesives.

Another aspect of the invention is to provide a method for reinforcing a wood composite that meets or exceeds the strength and durability requirements of ANSI/AITC 190.1.

Still another aspect of the invention is to provide a method for reinforcing a wood composite that meets or exceeds the strength and durability requirements of AITC 200.

It is an aspect of the invention to provide a method for reinforcing a wood composite that provides dual matrix composites.

Another aspect of the invention is to provide a method for reinforcing a wood composite that has outer regions of the panels being made with adhesives similar to, or identical to, the ones commonly used to bond wood to wood, panels to wood, or panels to other panels.

It is another aspect of the invention to provide a method for reinforcing a wood composite that has inner portions of the panel having resin system such as phenolic, epoxy, polyester, vinylester, etc.

Another aspect of the invention is to provide a method for reinforcing a wood composite that may be used with any type of fiber reinforcement such as glass, carbon, or aramid, bamboo, flax, or any combination of these fibers.

Finally, it is an aspect of the invention to provide a method for reinforcing a wood composite that may be produced with sacrificial edges so that the panels may be aligned with other wood laminae and easily planed or sanded.

Other aspects and advantages of the present invention will become apparent and obvious from a study of the following description and the accompanying drawings which are merely illustrative of the invention.

DETAILED DESCRIPTION OF THE INVENTION

The invention is a Resin-Starved Pultruded-Impregnated (RESPI™) panel and method of making the same. The Fiber-Reinforced Plastic (FRP) panel manufacturing technology of the present invention offers great promise for the reinforcement of wood structural elements such as glued laminated beams, sawn lumber, LVL's, PSL, LSL, I-joists, and structural panels such as OSB or plywood. RESPI™ technology was designed to allow FRP panels to be effectively bonded to wood surfaces using common wood adhesives. FRP panels produced using this technology may thus be bonded to wood surfaces and to one another using commonly used adhesives. RESPI™ panels have been shown to offer superior shear bond strength to wood surfaces that meet and exceed ANSI/AITC 190.1. RESPI™ panels have also been shown to meet and exceed cyclic-delamination requirements for glued-laminated beam construction (AITC 200).

Resin-starved pultruded-impregnated (RESPI™) panels are dual-matrix composites. The outer surfaces of the panels are partly made with adhesives similar to the ones commonly used to bond wood to wood, panels to wood, or panels to panels, while the inner portions of the panel may be made with any resin system such as phenolic, epoxy, polyester, vinylester, etc. RESPI™ panels may use any type of fiber reinforcement such as glass, carbon, aramid, bamboo, flax, or any combination of these fibers. RESPI™ panels may be produced with sacrificial edges so that they may be easily aligned with other wood laminae and easily planed/sanded in a wood composite manufacturing operation.

Figure 1:
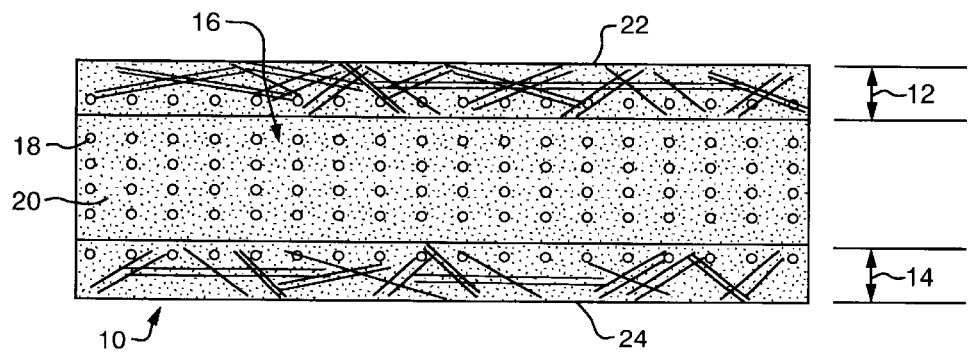
FIG. 1 is a sectional view of the center section of a panel of the present invention before impregnation with an impregnating adhesive.

The RESPI™ panels are manufactured using a three-step process. Referring to FIG. 1, in the preferred embodiment, the panels are first pultruded, using industry recognized methods, to produce a core section 16 made up of a plurality of fibers 18 bound together by a resin 20. However, it should be noted that though pultrusion is preferred, and therefore used throughout as the exemplary embodiment, other methods of producing core section 16, such as hand layup methods, vacuum bagging methods, hot pressed methods, sheet molding compound (SMC) methods, wet impregnating methods, or pre-impregnating methods, may be substituted for the pultrusion method of the preferred embodiment to obtain similar results.

One or both outer surface regions of the panel 12, 14, or the entire center portion 10 of the pultruded panel, are resin-starved. In this context, the term "resin starved" means that those regions of the panel, or the entire pultruded panel, contain less resin than would normally be required for optimum mechanical properties of pultruded products. The main objective of resin-starving the surfaces 22, 24 of the panel, or the entire pultruded panel, is to give the surface regions 12, 14 of the pultruded panel the ability to absorb significant amounts of additional resin or adhesive. The additional resin or adhesive should be chemically similar to the adhesive that will be used to bond the FRP to the immediately adjacent wood layer, or the FRP to the FRP. It should be noted that though different combinations of resins or adhesives may be used, for purposes of clarity, the term resin will be used to describe resins or adhesives which are part of the pultruded sections of the panels of the present invention while the term adhesive will be used to describe resins or adhesives that are used to saturate the surfaces of the pultruded sections, to bond the FRP to the wood, FRP to FRP or to bond the wood to other wood members.

Figure 2:
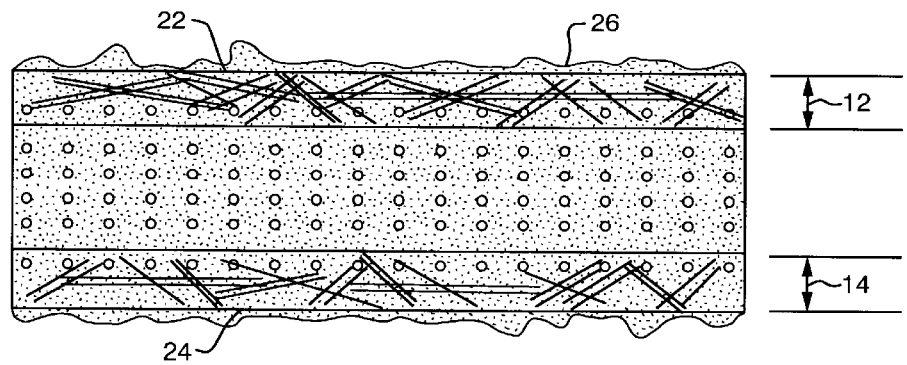
FIG. 2 is a sectional view of a panel of the present invention after impregnation with an impregnating adhesive but before removal of excess adhesive.

Referring now to FIG. 2, the step 2 is to impregnate the now pultruded, but resin-starved, panel with an adhesive chemically similar to the adhesive to be used in bonding the FRP laminations to the wood, the FRP laminations to one another, or the wood to the wood. For example, in the manufacture of reinforced glued-laminated beams the pultruded, resin-starved surface regions 12, 14 of the FRP panel may be impregnated with a PRF adhesive. At this stage, the PRF adhesive penetrates into the surfaces 22, 24 of the resin-starved panel. It can do so because the surface regions 12, 14 of the panel have been resin starved during the pultrusion operation. Once the resin-starved panel is impregnated, the concentrations of the adhesive, thus introduced into the resin-starved panel, will be highest near the surfaces 22, 24 of the resin-starved panel and decrease further below the surface of the panel. The objective of this manufacturing step is to saturate, to the fullest extent possible, the resin-starved surface regions 12, 14 of the panel with the adhesive, to fill and eliminate voids and holes and to obtain a smooth surface minimizing defects and irregularities. Once this step is completed, one may find excess uncured adhesive on the surface of the panel, resulting in a non-uniform surface 26.

Figure 3:
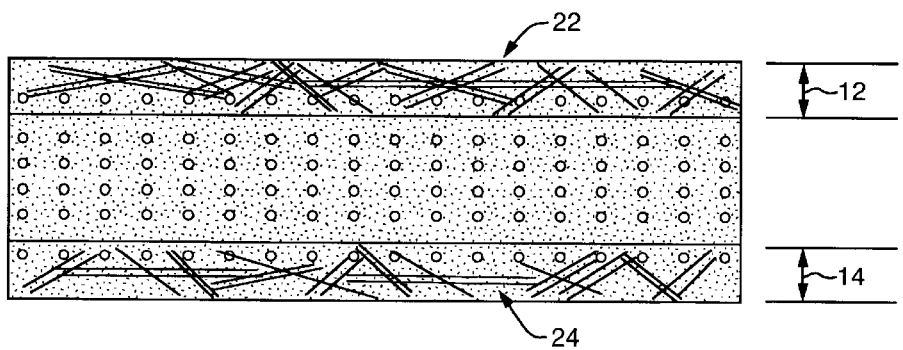
FIG. 3 is a sectional view of panel of the present invention after excess adhesive has been removed.

The third step in manufacturing the panel is to remove the excess uncured adhesive from the surfaces 22, 24 of the resin-staved-impregnated panel. As shown in FIG. 3, this removal results in smooth, flat surfaces 22, 24 having minimal voids, holes, depressions, recesses and surface irregularities, such as fibers extending through the surfaces. The panel should then be protected from dust, oils, or contaminants until it is ready to be bonded to the wood or to another RESPI™ panel.

The RESPI™ panel is now ready to be bonded to a wood surface or to another RESPI™. The adhesive used to bond the FRP to the wood or the FRP to the FRP forms a strong physico-chemical bond with the surface of the RESPI™ panel because of the chemical similarity between the adhesive and the surface of the RESPI™ panels. This enhances the inter-diffusion of molecules between the adherent and the adhesive, resulting in a strong, durable chemical bond. Laboratory tests have shown that the bond thus developed allows the wood/FRP and the FRP/FRP bond to meet or exceed shear strength requirements for the manufacture of glulam beams. In addition, testing has shown that material failure at the bond line exceeds the 90% level. Finally, standard cyclic-delamination tests, such as AITC 200, are easily passed by the RESPI™ panel reinforced glue laminated beams. Dry shear strengths of FRP-wood can be in the order of between 1,300 pounds per square inch (PSI) and 1500 PSI, for Douglas fir and western hemlock, and the shear strength of the FRP-FRP bond is typically in the range of 1,600–1,900 PSI.

The present invention can be used with any structural wood products such as a glulam beam, LVL beam, or structural wood panel that can be reinforced with a panel. The invention can also be used with any panel having sacrificial edges, such as the panel shown in FIG. 4. Sacrificial edges 28, 30 facilitate the manufacturing of reinforced glulam beams and increase manufacturing speed. In this invention, the width of the RESPI™ reinforcing panel is manufactured approximately equal to the size of the individual wood laminations before final planing of the beam. The width of the RESP™ reinforcing panel is not smaller than the width of the wood laminations so that it does not have to be manually aligned in the shop. The reinforcing RESPI™ panel may incorporate two "sacrificial", easily planable edges 28, 30 on each side so as not to damage the planer blades. Thus, for example, for a 5⅛ inch DF glulam beam width made by laminating 2 inch×6 inch nominal lumber, the FRP in the present invention is 5½ inch wide to match the 2 inch×6 inch individual nominal lamination width. The FRP also incorporates two sacrificial edges 28, 30, approximately ⅜ inch each, which are easily planable. The sacrificial edges thus protect the planer blades and make it easy to align the reinforcing panel in the clamps. This significantly speeds up the manufacturing process compared to the option where the width of the reinforcing panel is made smaller than the beam to avoid contact with the planer blades.

The use of the RESPI™ panels of the present invention eliminates the need for surface treatment to "hair up" fibers or to induce the formation of recesses in the surface of the synthetic reinforcement. The FRP sheets do not require special tensioning of the fibers in excess of what is normally achieved by normal pultrusion. In addition, special "pairs of rollers" to apply "solid particulates to fibers and resin encasements" are not needed. The reinforcing panel is preferably not made smaller than the original width of the laminations.

Figure 4:
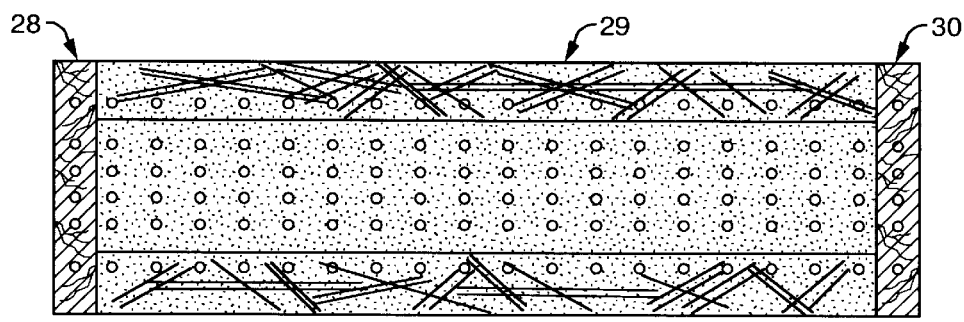
FIG. 4 is a sectional view of an alternative embodiment of the panel having sacrificial edges.
Figure 5:
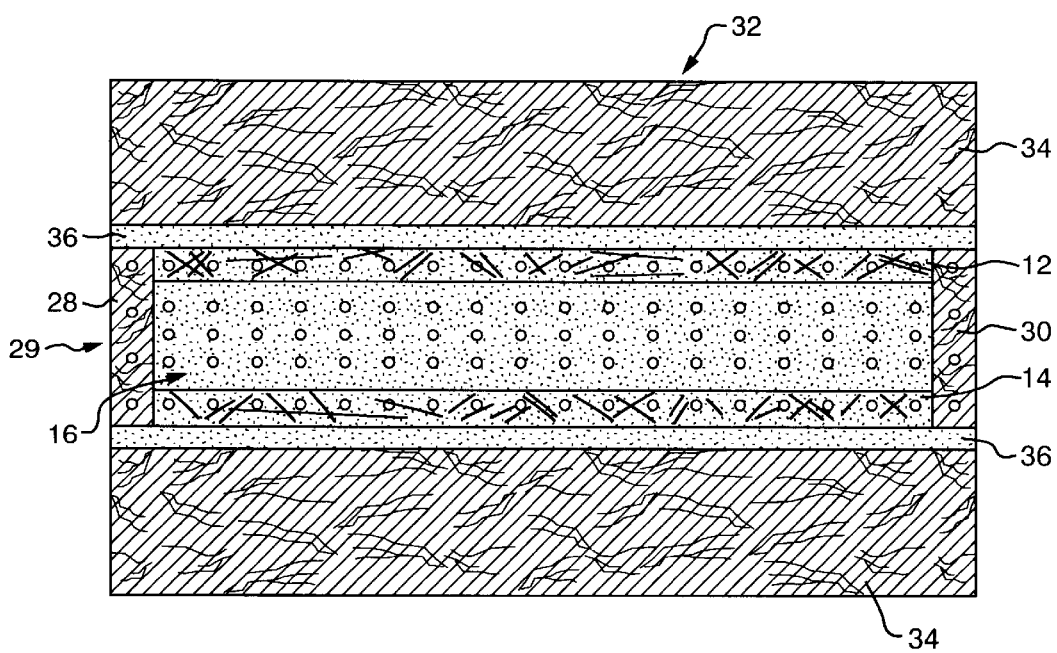
FIG. 5 is a sectional view of an embodiment of the wood composite of the present invention utilizing a panel having sacrificial edges.

Referring now to FIG. 5, a sectional end view of a wood composite 32 of the present invention is shown. The wood composite 32 is made up of wooden members 34, the RESPI™ panel 29 of FIG. 4, and layers of a bonding adhesive 36 which act to bond the layers together. As shown in FIG. 5, the RESPI™ panel 19 includes a core section 16, surface regions 12, 14 impregnated with impregnating adhesive, and sacrificial edges 28, 30 on the two outside edges of the RESPI™ panel 19. It should be noted that though FIG. 5 illustrates a simple composite utilizing only two wooden members 34, that different arrangements of wooden members 34 and RESPI™ panels 29, having sacrificial edges on all four edges of the panel or on none of the edges of panel, may be utilized to obtain similar results.

The strength of the adhesive joint between the wood and the FRP reinforcement is an important component affecting the structural integrity of the reinforced wood composite or structural member. One mechanism responsible for bond strength of a RESPI™ panel to another RESPI™ panel, or to a wood surface, is the inter-diffusion of molecules between the adhesive and the chemically similar RESPI™ panel surface. Therefore, a preferred embodiment of the present invention utilizes pultruded phenolic reinforcing FRP sheets, impregnated with phenol-resorcinol formaldehyde adhesives, bonded to the wood, or to one another, using phenol-resorcinol formaldehyde adhesives commonly used in the fabrication of laminated wood structural members. However, it should be understood that other resins and adhesives may be utilized to achieve similar results.

A phenolic resin used to manufacture the pultruded resin-starved FRP panels may be, for example, GP-442D35 RESI-SET, developed by Georgia Pacific Resin, Inc., and preferably modified as described below. A chemically similar phenolic adhesive used to impregnate the resin-starved pultruded panel may be, for example, GP Resorsabond 4242/4554 Slurry Adhesive. The adhesive used to bond the RESPI™ panel to another RESPI™ panel or to bond the RESPI™ panel to a wood laminae may be, for example, GP Resorsabond 4242/4554 Slurry Adhesive.

The use of phenolic matrix FRP's is preferred because of their chemical similarity to the PRF adhesives widely used in engineered wood structural members, thereby resulting in improved bond strength. As an added advantage, these resins also provide superior fire resistance.

The curing of phenolic resins produces a highly crosslinked, three dimensional network structure which proceeds by a condensation polymerization process and produces a significant amount of water as a by-product. This water escapes as steam at the high temperatures of 265 to 360 degrees F. typically employed during pultrusion of phenolic FRPs, resulting in a naturally porous matrix. Depending on the formulation of the specific phenolic resin used in the pultrusion, more or less water may be present in the uncured resin. For example, GP-442D35 RESI-SET, developed by Georgia Pacific Resin, Inc., gives better results when 1 to 2% more water by weight is added to the resin. Once cured, the phenolic sheets used by the pultrusion industry are typically lightly sanded to remove the surface glaze and enhance the bond properties. Electron microscopy has shown that such light sanding does not cause glass fibers to "hair up".

In the present invention, the FRP reinforcing sheets may be fabricated using the well-known pultrusion process which produces mostly parallel fibers. No change to the pultrusion manufacturing process is needed, except that a resin-starved pultruded panel is required. To produce a resin starved panel, less resin is used than is normally required for optimum mechanical properties. For panels thicker than ⅛ inch, the resin-starved regions of the panel are preferrably restricted to the surface regions of the panel, so that the mechanical properties and durability of the panel are not compromised. A resin starved panel is one in which less resin is used in the manufacturing process, preferably near the surface areas of the panel only. This may be achieved by increasing the fiber/resin ratios near the surface of the pultruded panel.

If a phenolic resin is utilized in the pultrusion, it is recommended to use glass fibers sized for phenolics to achieve the best combinations of strength, stiffness and economy for the reinforcing FRP panels. However, the sustained load on the glass should be kept to less than 30% of the ultimate strength of the glass to avoid creep-rupture problems and to reduce cracking of the matrix. Reduced cracking within the phenolic matrix is important to protect the glass fibers from environmental and chemical attack, and to increase the long-term durability.

The optimum processing parameters for the phenolic FRP are critical not only to achieve the required bond strength as per ANSI/AITC 190.1 but also to achieve adequate panel longitudinal and transverse tensile strength, stiffness, toughness and adequate shear strength. The optimum FRP processing parameters will vary depending on the type of phenolic resin used, fiber type and fiber volume. One possible set of processing parameters utilizes a line speed of between ten and fifteen inches per minute and a die temperature of between 360 and 485 degrees Fahrenheit.

Once a resin-starved pultruded panel is produced, as described above, it should be cleaned to remove all loose particles, dust, oils or other contaminants from the surface. It is, then impregnated by spreading the adhesive uniformly on the surface of the panel using, for example, a roller applicator. The amount of adhesive required varies with the type of panel, fiber ratio near the surface, thickness of panel, and degree to which it is resin-starved. PRF adhesive spread rates, for example, may be in the order of 20–50 lbs/ft2. Once the adhesive is spread uniformly on the surfaces of the resin-starved panel, the adhesive is allowed time to penetrate the surface of the panel. However, before the adhesive starts to cure, the excess adhesive must be removed from the panel surface to form a smooth, flat surface which minimizes voids, holes, depressions, recesses, surface irregularities, or any fibers accidentally extending through the surface.

One way to remove the excess adhesive and to obtain the desired quality surface is to run a thin rectangular metal plate over the surface of the panel, thereby "scraping off" the excess adhesive from the surface. The processes described in this paragraph may be automated.

It is well known in bonding composite materials that one must allow proper "gel time" for the adhesive to reach an optimum viscosity. Once the adhesive is applied to the RESPI™ panel surface, "gel time" is the time the adhesive is allowed to "dry", exposed to the air, before the two adherents are brought into contact. For maximum bond strength, one needs to determine optimum gel time based on the viscosity of the resin used, the local plant conditions (temperature and humidity), adhesive spread rates, and shape of the extruded adhesive surface.

The sacrificial edges 28, 30 of FIG. 4 may or may not be used on a RESPI™ panel. If used, the sacrificial edges 28, 30 may be pultruded simultaneously as the resin-starved panel is being pultruded; through the same dye. In this case, the sacrificial edges include fibers that may be easily sanded or planed with common wood sanders or planers. Such fibers may be, but are not restricted to, flax, polypropylene or PVC fibers. If not pultruded simultaneously with the rest of the panel, the sacrificial edges may be post-bonded on the pultrusion line as the hot, resin-starved panel comes out of the forming dye. Another option is to add or bond the sacrificial edges to the RESPI™ panel in an off-line process. In this case, the texture and color of the sacrificial edges may be adjusted to suit the esthetics of the beam.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A resin starved panel for use as a reinforcement for wood, said panel having two surfaces and a plurality of edges and comprising:
   a center portion having a core and two surfaces, said center portion comprising a plurality of fibers bound together by a predetermined resin such that said surfaces of said center portion contain significantly less resin than said core;
   a layer of an impregnating adhesive bonded to each surface of said center portion; and
   at least one sacrificial edge disposed along at least one of said plurality of edges of said panel;
   wherein said impregnating adhesive forming said surfaces of said panel has similar chemical properties to chemical properties of a predetermined bonding adhesive to be used to laminate said panel to another surface such that a physico-chemical bond is formed between said impregnating adhesive and said predetermined bonding adhesive when said panel is bonded to said surface; and
   wherein said impregnating adhesive is not said predetermined resin.

2. The panel as claimed in claim 1 wherein said center portion is a pultruded center portion.

3. The panel as claimed in claim 2 wherein said pultruded center portion comprises a pultruded fiber reinforced plastic sheet impregnated with a phenol-resorcinal formaldehyde adhesive.

4. The panel as claimed in claim 3 wherein said pultruded fiber reinforced plastic sheet is reinforced with fibers chosen from a group consisting of glass fibers, carbon fibers, aramid fibers, bamboo fibers, and flax fibers.

5. The panel as claimed in claim 1 wherein said sacrificial edges disposed along a pair of longitudinal edges of said panel.

6. A wood composite comprising;
   at least one wooden member having two surfaces disposed in substantially parallel relation to one another;
   at least one resin starved panel disposed at a predetermined location adjacent said at least one wooden member; and
   a bonding adhesive disposed between said surfaces of said at least one wooden member and said at least one resin starved panel to bond said surfaces together;
   wherein said resin starved panel has two surfaces and four edges and comprises;
      a center portion having a core and two surfaces, said center portion comprising a plurality of fibers bound together by a predetermined resin such that said surfaces of said center portion contain significantly less resin than said core;
      a layer of an impregnating adhesive bonded to each surface of said center portion; and
      at least one sacrificial edge disposed along at least one of said plurality of edges of said panel;
      wherein said impregnating adhesive has similar chemical properties to chemical properties of said bonding adhesive such that a physico-chemical bond is formed between said impregnating adhesive and said predetermined bonding adhesive; and
      wherein said impregnating adhesive is not said predetermined resin.

7. The wood composite as claimed in claim 6 wherein said resin starved panel further comprises a pair of sacrificial edges bonded to a pair of longitudinal edges of said panel, said sacrificial edges being of an easily planable material such that said resin starved panel may be easily aligned with said wooden member.

8. The wood composite as claimed in claim 6 comprising a plurality of wooden members and wherein said at least one resin starved panel is disposed at a predetermined location in relation to said plurality of wooden members.

9. The wood composite as claimed in claim 6 wherein said panel is disposed between two of said plurality of wooden members.

10. The wood composite as claimed in claim 9 wherein said wooden members and said at least one resin starved panel are bonded together to form a glulam beam.

11. The wood composite as claimed in claim 9 wherein said wooden members and said at least one resin starved panel are bonded together to form an LVL beam.

12. The wood composite as claimed in claim 9 wherein said wooden members are wood veneers and wherein at least one resin starved panel and said wooden veneers are bonded together to form a reinforced plywood panel.

13. The wood composite as claimed in claim 9 wherein said wooden members are wooden flakes an said at least one resin starved panel and said wooden flakes are bonded together to form a reinforced OSB panel.

14. The wood composite as claimed in claim 9 wherein said wooden members are wooden strands and said at least one resin starved panels are bonded to said wooden strands to form a reinforced PSL.

15. The wood composite as claimed in claim 9 wherein said wooden members are wooden strands and said at least one resin starved panels are bonded to said wooden strands to form a reinforced LSI.

16. The wood composite as claimed in claim 9 wherein shear strengths of bonds between surfaces of said at least one resin starved pultruded panel and surfaces of said wooden members exceeds a shear strength of said wooden members.

17. A method of manufacturing a wood composite, said method comprising the steps of:
   forming a resin starved impregnated panel, said forming step comprising the steps of:
      forming a center portion having a pair of resin starved surfaces;
      impregnating said resin starved surfaces with an impregnating adhesive;
      removing a portion of said impregnating adhesive to form a substantially smooth flat surface;
      curing a remaining portion of said impregnating adhesive to a desired degree; and
      bonding a pair of sacrificial edges to said panel;
   disposing said resin starved impregnated panel against at least one wooden member; and
   bonding said panel and said at least one wooden member together to form a wood composite.

18. The method as claimed in claim 17 further comprising the step of bonding at least one additional resin starved impregnated panel to said resin starved impregnated panel.

* * * * *